United States Patent [19]

Fairbanks et al.

[11] 4,008,115

[45] Feb. 15, 1977

[54] METHOD FOR MAKING DURABLE OVERCOATED LABELS

[75] Inventors: Daniel F. Fairbanks, Needham; Frank A. Magnotta, Framingham; Warren R. Pitts, Winchester, all of Mass.

[73] Assignee: Dennison Manufacturing Company, Framingham, Mass.

[22] Filed: Feb. 25, 1976

[21] Appl. No.: 661,401

[52] U.S. Cl. .............................. 156/267; 156/272; 156/280; 427/54; 427/259; 427/261

[51] Int. Cl.$^2$ .................... B31B 31/00; B29C 19/02

[58] Field of Search .......... 156/267, 272, 278, 280; 427/54, 261, 265, 259, 350

[56] References Cited

UNITED STATES PATENTS

| | | | |
|---|---|---|---|
| 3,020,186 | 2/1962 | Lawrence | 156/267 |
| 3,032,463 | 5/1962 | Morgan | 156/267 |
| 3,853,578 | 12/1974 | Suzuki et al. | 427/259 |
| 3,928,661 | 12/1975 | Higbee et al. | 427/259 |
| 3,959,521 | 5/1976 | Suetsugi | 427/54 |

*Primary Examiner*—Douglas J. Drummond
*Attorney, Agent, or Firm*—Kenneth D. Hudson

[57] ABSTRACT

A method is disclosed for providing protective overcoatings to the surface of labels which are spaced apart and removably adhered to the release surface of a carrier web, the method comprising applying to the surface of the labels and to the surface of the carrier web exposed between labels a radiation-curable liquid composition, the composition wetting the surface of the labels to form a continuous film thereover, but not wetting the exposed release surface of the carrier web and forming thereover beads of liquid substantially unconnected to the continuous film over the labels, and thereafter exposing the films to a source of radiation sufficient to cure them to solvent resistant and abrasion resistant layers.

16 Claims, 3 Drawing Figures

METHOD FOR MAKING DURABLE OVERCOATED LABELS

BACKGROUND OF THE INVENTION

This invention relates to a series of labels removably adhered in spaced apart relation to the release surface of a carrier web, typically a smooth dense paper coated with a silicone release layer. The labels typically comprise an adhesive in contact with the release layer, a label base layer and contrasting indicia in one or more colors printed over the label base layer. Such labels are in wide commercial use for attachment to various articles and materials for identification, for decoration, and for provision of operating characteristics and instructions. Such labels are often referred to in the trade as "laid-on" labels.

Where long life and/or protection from abrasion, solvent or chemical attack are desired, metal name plates, labels covered with a protective laminate of plastic film such as Mylar, or heat cured coatings of epoxy resins have been used. Such labels are relatively expensive and sometimes difficult to apply. Heat cured overcoatings, typically requiring temperatures of 300° F. or more for 60 seconds or more, require expensive ovens and the heat can adversely affect or distort underlying layers. Where the coatings are applied by kiss-coating techniques in which the coating is applied to the raised surface of the labels but not substantially to the intervening release carrier surfaces, problems of control are sometimes encountered. Also, the coating will sometimes bridge the interval between successive labels such that dispensing of the first label will also dispense the second which is connected thereto, especially when such labels are dispensed in high speed automatic labelling equipment. Solvents also can attack underlying materials and catalyzed coating compositions have limited pot life.

OBJECTS OF THE INVENTION

It is the principal object of the present invention to provide an improved method for making a series of labels removably adhered to a carrier web which are of high quality and which provide an attractive appearance and good protection for the labels. Further objects include the provision of an improved method which is easy to control, relatively inexpensive, which does not require curing ovens or other expensive equipment, and which can be carried out at moderate temperatures, without volatile solvents and at relatively high speeds.

SUMMARY OF THE INVENTION

The present invention comprises a method of making a series of labels, sometimes known as "laid-on" labels, each of which has a solvent and abrasion resistant overcoating, the labels being spaced apart on a temporary carrier web from which each label is individually removable, said method comprising as steps providing a series of laid-on labels spaced apart and removably adhered to a temporary carrier comprising a carrier web having a release surface in contact with the underside of the labels and exposed in the spaces between labels, said labels comprising an adhesive, a base layer, and indicia over the base layer, forming a continuous film over the surface of said labels and a discontinuous film over the exposed release surface of the carrier web between labels by applying to the surface of both the labels and exposed release surfaces a thin layer of radiation-curable liquid, said liquid wetting the surface of the labels but not the exposed release surfaces, the liquid forming over said release surfaces by surface tension beads of liquids substantially unconnected to the continuous film over the surfaces of the labels, and thereafter exposing said films to a source of radiation sufficient to cure the liquid or overcoating on the labels to a solvent and abrasion resistant layer. Beads of liquid as the term is herein used refers to small areas or islands of material which are substantially unconnected to the continuous film on the labels, and preferably substantially unconnected to each other.

The radiation-curable liquid is preferably of low viscosity and comprises a copolymerizable mixture of prepolymers and monomers polymerizable by exposure to radiation such as actinic light or electron beam or the like. Preferably the monomers are acrylate monomers, including acrylic acid, alkyl acrylic acids such as methacrylic acid, and esters thereof. Preferred prepolymers are acrylated epoxy resins or acrylated polyether-polyisocyanate resins. It is also preferred that the monomers employed include at least one monomer having three or more acrylate groups to promote rapid cross-linking polymerization, most preferably trimethylolpropane triacrylate.

Acrylated epoxy resins are commercially available as solvent solutions for catalytic curing with heat, for example EPOXRYL 25 A 60 from the Shell Chemical Company. Preferred acrylated polyether-polyisocyanate resins and monomer solutions thereof for radiation curing are more fully described in copending application Ser. No. 400,364 by Karl Brack, filed Sept. 24, 1973 and assigned to the same assignee as the present application, and the disclosure thereof is incorporated herein by reference. Such preferred compositions are therein defined as comprising a liquid prepolymer which is the stepwise reaction product of (a) substantially three mols of a polyisocyanate with (b) substantially one mol of a polyether triol and (c) an unsaturated alcohol selected from allyl alcohol, 5-norbornene-2-methanol and hydroxy lower esters of acrylic or methacrylic acids; and sufficient acrylate ester monomer copolymerizable by radiation with said prepolymer to provide coating viscosity, said monomer including at least one monomer having three or more unsaturated acrylate or methacrylate groups to promote cross-linking.

Preferably the liquid radiation-curable material is of relatively low viscosity, preferably below about 200 seconds as measured with a No. 2 Zahn cup, more preferably below about 100 seconds, and most preferably between about 80 and about 100 seconds. Also preferably, it contains a photo-initiator sensitive to ultra-violet light for curing with ultra-violet radiation, and includes a wetting agent promoting the wetting of the surface of the labels by the liquid composition but without significantly enhancing wetting over the exposed surface of the release carrier web.

The radiation-curable liquid coating can be applied to the carrier web and labels by any suitable means. Conveniently, it can be applied by means of a press, for example a flexographic press, similar to the press used to print the indicia on the labels. The liquid can be applied on the same press used to print the labels, or more conveniently, it can be applied on a second similar press. Where separate presses are employed, the labels can be inspected prior to overcoating and defects eliminated, and the labels can be printed and overcoated at speeds best suited to each. As indicated in co-pending application Ser. No. 400,364 identified above, the liquid can be cured rapidly, generally one second or less, and the coating speeds employed can be 75 feet per minute or higher. To obtain a smooth uniform overcoating, it is preferred that the coating be applied in two or more applications, the second or subsequent applications tending to smooth the coating. Levelling agents to enhance uniformity of coating can be employed if desired. Preferably the thickness of cured coating is between about 0.2 and 0.4 mils in thickness.

DESCRIPTION OF PREFERRED EMBODIMENTS

Figure 3:
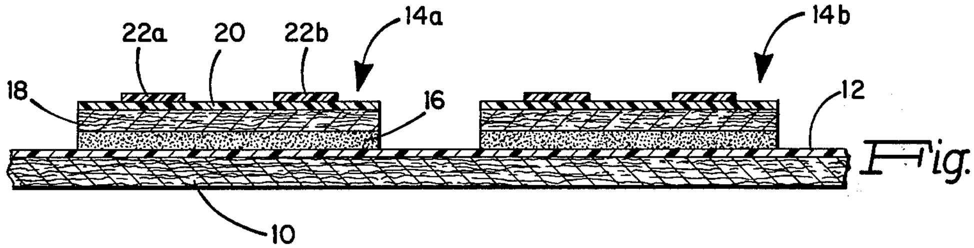
FIG. 3 is a section on the line 3—3 of FIG. 2 illustrating in transverse section two side-by-side labels to which the protective overcoating is applied.

Referring to the drawings, FIG. 3 illustrates a series of laid-on labels made by techniques well known in the art. It comprises a carrier web 10 of smooth paper such as glassine or the like, having a cured silicone release coating 12 on its upper surface. Removably adhered to the silicone release surface 12 are labels 14*a* and 14*b* which are identical and which comprise a pressure-sensitive adhesive 16, a label base material 18, preferably a tie coat 20 and printed ink indicia 22*a* and 22*b* in contrasting colors. The labels can be conventionally prepared by providing a laminate of co-extensive layers of carrier web 10, silicone release coating 12, pressure-sensitive adhesive 16 and label base stock 18. A roll of such material is mounted for feeding through a press, for example a flexographic, letter-press, or rotogravure press, the tie coating applied over the entire surface of base material 18 at the first station of the press, and indicia 22*a* and 22*b* printed in one or more colors by additional press stations. Any solvent included in the tie coating or indicia is evaporated in the press. After printing, the web is passed along the press through a die-cut station at which a die having a thin metal blade is reciprocated to cut through all the layers except carrier web 10 and silicone coating 12 in the peripheral outline desired for the individual labels, for example a rectangle, thereby providing a skeleton of surplus materials 16, 18 and 20 between labels. The skeleton is then removed or stripped from the carrier web and the resulting series of label wound into a storage roll.

Figure 2:
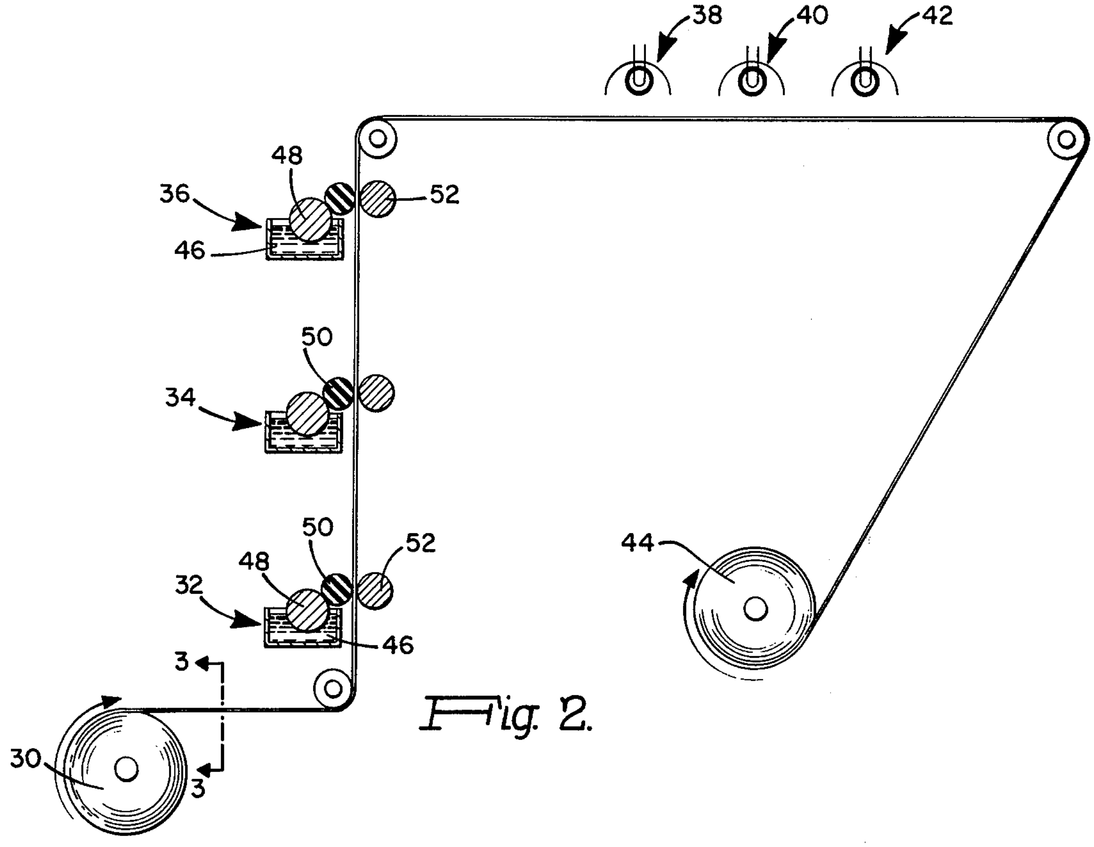
FIG. 2 is a schematic side view of the process by which the protective overcoating of the present invention is applied.

Referring to FIG. 2, the storage roll of labels 30, is mounted for feeding through a second press. The labels pass through applicating stations 32, 34 and 36 wherein overcoating liquid is applied to the upper surface of the labels and to the exposed silicone surface between labels, then beneath ultraviolet lamps 38, 40 and 42 where the liquid overcoating is cured, and the finished labels are rewound at 44.

Each of the coating stations 32, 34 and 36 comprise a reservoir of overcoating liquid 46, an Anilox metering roll 48 partially immersed in and revolving in liquid reservoir 46, a hard smooth rubber transfer roll 50 and a steel back-up roll 52. The Anilox rolls are steel rolls having lines of depressions or pockets etched into the surface thereof which turn against a doctor blade (not shown) to provide a metered amount of coating for transfer to roll 50. Preferably Anilox rolls of increasing fineness and decreasing capacity are employed in the successive coating stations 32, 34 and 36. Preferably an Anilox roll having 165 etched lines per inch is employed in coating station 32, an Anilox roll having 180 lines per inch at station 34, and an Anilox roll having 200 lines per inch at station 36 are employed to provide a total cured coating thickness of about 0.3 mil. By such use of a plurality of coating stations, and also preferably by applying decreasing amounts of coating, it has been found that overcoatings of greater uniformity and smoothness can be obtained.

Any suitable source of radiation for curing the coating liquid 46 can be employed, for example an electron beam or actinic light. Preferably the sources employed are ultra-violet lamps and the liquid overcoating material 46 contains a photoinitiator sensitive to said ultraviolet radiation as more fully hereinafter explained. While any suitable lamp can be employed, for example Xenon flash lamps, the lamps illustrated are commercially available, medium pressure, mercury vapor, Hanovia lamps having eliptical reflectors with the source of radiation at 1 focus and the web overcoating positioned at the other focus and with a power of about 200 watts per inch. With the coating stations and lamps illustrated, the press can be operated to advance the carrier web and labels therethrough at linear speeds from about 75 to about 120 feet per minute or higher.

Figure 1:
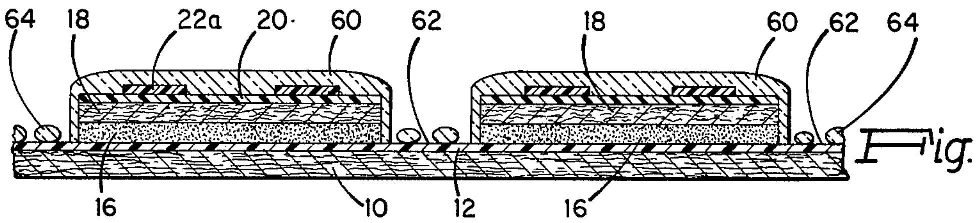
FIG. 1 is a longitudinal section illustrating a carrier web having removably adhered thereon two spaced labels in accordance with the present invention.

The liquid overcoating composition 46 wets the surface of the labels to form a continuous coating thereover and partially or entirely over the edges thereof, but does not wet the exposed surfaces of the release coating exposed between labels where the coating forms discontinuous beads of liquid substantially unconnected to the continuous coating over the labels. The resulting overcoating labels are illustrated in FIG. 1 wherein the continuous cured overcoating over the labels is indicated at 60, the exposed surfaces of the release coating 12 between labels at 62 and the discontinuous beads of liquid coating at 64, the height of the beads 64 after curing being exaggerated for clarity.

While commonly used materials have been illustrated in the drawings, other suitable materials may be employed. For example, any suitable release carrier web can be used and adhesives activatable by heat or solvent can be substituted for the preferred pressure-sensitive adhesive illustrated. Substantially any desired label base material can be employed. However, since protectively overcoated labels are normally employed where high strength and durability are desired, relatively strong and durable label base materials are preferred, for example pigmented or unpigmented plastic films such as rigid or flexible vinyl, Mylar, coated papers, metal foils, or metallized plastic films.

The tie coat 20 optionally illustrated in the drawing is preferred but may be omitted where the adhesion of the ink indicia and the protective overcoating to the particular label base material selected is adequate, for example where paper is used. However, a tie coating of a material which enhances the adhesion between the label base material selected and the inks and overcoating liquid is preferred. It is considered commercially desirable to utilize a standard series of inks and overcoating formulations and to alter the composition of tie coating selected to assure adhesion to various base materials. For example, pigmented solvent inks employing a polyvinyl resin binder, for example polyvinyl chloride, polyvinyl acetate or copolymers thereof, have been found desirable. With such inks, a tie coating comprising a lacquer using a similar polyvinyl resin binder material has been found to provide good adhesion to a large variety of label base materials. Alternatively, polyester lacquers provide satisfactory tie coat compositions where polyester base materials such as Mylar are used.

A number of substantially one hundred percent solids radiation curable liquids are known. Preferred for this invention are those which are rapidly curable and which provide good abrasion, chemical and solvent resistance when formulated in low viscosity compositions. Compositions of epoxy prepolymers acrylated to provide terminal polymerizable acrylate groups, or the acrylated polyether-polyisocyanate prepolymers or oligomers disclosed in co-pending application Ser. No. 400,364, dissolved in acrylate monomers and copolymerizable therewith, are preferred. Suitable monomers in addition to trimethylolpropane triacrylate include acrylated epoxidized soybean oil, hydroxyl ethyl acrylate, hydroxyethyl methacrylate, 1,4-butanediol diacrylate, neopentyl glycol diacrylate, pentaerythritol tetraacrylate, pentaerythritol triacrylate, 1,6-hexanediol diacrylate, butyl acrylate, isodecyl acrylate, octadecylacrylate, dimethyl aminoethyl methacrylate, acrylic acid, methacrylic acid, acrylamide and/or methylene bis-acrylamide or the like. Sufficient monomer should be employed with the prepolymer to provide a low viscosity overcoating liquid preferably having a viscosity less than about 200 seconds, and more preferably less than about 100 seconds, as measured with a No. 2 Zahn cup. The viscosity most preferred is between about 80 and about 100 seconds.

As also disclosed in co-pending application Ser. No. 400,364, the curable overcoating liquid can include small amounts of inhibitor to prevent premature polymerization and should include ultra-violet photo-initiators, for example benzoin isobutyl ether, for use with ultra-violet radiation. Where energetic radiation such as electron beams are employed, photo-initiators are not necessary.

Small amounts of additional coating aids may also be included in the radiation curable overcoating liquid. For example, it is preferred to employ a wetting agent to promote the wetting of the label surface by the overcoating liquid, and to include internal flow promoting materials, generally internal lubricants such as wax-like, fluorocarbon or silicone materials to aid in obtaining a smooth uniform coating, to enhance the gloss of the film, and/or to diminish the effect of atmospheric oxygen on the photopolymerization reaction. Such flow-promoting and glossing agents, commonly employed in printing inks, are preferably omitted from the inks and tie coats employed with this invention to avoid reduction in adhesion.

The materials and procedures currently preferred are illustrated in Example 1 below.

EXAMPLE 1

A commercially available roll of pressure-sensitive label stock was mounted for feeding through a flexographic press. The stock comprised a laminate of (1) a carrier web, e.g., glassine paper having on one surface a silicone release coating, (2) a pressure-sensitive adhesive, e.g., a synthetic acrylic based adhesive, and (3) a label base material comprising a three-ply, biaxially-oriented polypropylene synthetic paper, commercially available under the trademark KIMDURA. At the first station on the press, an adhesion-promoting tie coating of PRO-KOTE Primer F79797 of Inmont Corp., understood to be an acrylic based lacquer, was applied to the surface of the label base in a thin layer and thereafter dried to a thickness less than about 0.1 mil. As the label stock advanced along the feed-path of the press at 200 to 400 feet per minute, ink indicia was printed at additional press stations over the tie coat and dried. The ink comprised a pigmented resin solution of polyvinyl chloride in a volatile solvent. Labels having a single color and multiple colors, obtained by changing the pigments and using multiple printing stations, were printed. Both the tie coat and inks were formulated without wax-like glossing agents, customarily used in inks.

After the indicia were printed and dried, individual labels were made by die-cutting, with a reciprocating blade in the outline of the periphery of the desired labels, through all layers except the underlying carrier web with its release coating. The skeleton of surplus material between labels so formed was stipped away from the carrier web and the carrier web with its series of labels wound into a storage roll.

The storage roll so provided was placed into the feed means of a second flexographic press and the roll fed through the press as illustrated in FIG. 2. At the three printing stations 32, 34 and 36, successive increments of a coating of a radiation-curable liquid, described below, was applied to a total thickness of about 0.3 mil (about 7.6 microns). At the first station 32, an Anilox metering roll having 165 etched lines per inch was employed, while at stations 34 and 36 rolls having 180 and 200 lines per inch were employed, respectively. The majority of the coating was applied at the first station 32, and lesser portions added at the subsequent stations to provide a smooth, uniform and glossy coating.

Normal flexographic printing pressure was employed at all stations and the coating was applied both to the surface of the labels and to the exposed release surface of carrier web. The coating wetted the surface of the labels forming a continuous coating thereover but did not wet the release surface where it separated into discontinuous, substantially unconnected areas or beads of coating. The thus coated web and labels were then passed under three medium pressure, mercury-vapor, ultra-violet lamps (Hanovia lamps having an output of 200 watts per inch) at a linear speed of 75–120 feet per minute, the lamps including an elliptical reflector with the coating being located approximately at one focus thereof. The exposure cured the coating to a hard durable material having excellent gloss and solvent and abrasion resistance. The labels were then wound into a roll without blocking. Individual labels can be dispensed from the roll by hand or by convention machine application, e.g. by bending the carrier web over a sharp edge, without dispensing multiple, successive labels. The cured disconnected areas or beads of coating material on the release surface of the carrier are not removed therefrom during normal application.

The composition of the ultra-violet radiation-curable liquid employed in Example 1 had the following composition.

| | % By Weight |
|---|---|
| EPOCRYL 25 A 60 (60% solids) | 29.85 |
| 1,6-Hexanediol diacrylate | 29.85 |
| trimethylalpropane triacrylate | 29.85 |
| Silane A-174 | 2.34 |
| Actomer X-70 | 7.47 |
| p-methoxy phenol | 0.02 |
| Halocarbon Oil 437 | 0.52 |
| Zonyl FSN | 0.08 |

In the above mixture, EPOCRYL 25 A 60 is an acrylated epoxy oligomer in volatile solvent of the Shell Chemical Corp. After mixing with the 1,6-hexanediol diacrylate, the solvent originally present in the EPOCRYL 25 A is removed, preferably under vacuum. After solvent removal, the remaining ingredients are added and mixed thoroughly. Silane A-174 is a methacryl oxypropyl trimethoxy silane obtained from the Union Carbide Co., Actomer X-70 is an acrylated epoxidized soybean oil from the Union Carbide Co., Halocarbon Oil 437 is a waxy, halogenated hydrocarbon of the Halocarbon Products Corp., and Zonyl FSN is a wetting agent obtained from Dupont. The wetting agent is employed to promote wetting of the label surface, the Silane A-174 and Halocarbon Oil 437 to promote flow and levelling of the coating after application to the label surface and prior to cure, and p-methoxy phenol is an inhibitor added to prevent premature polymerization. Prior to use, about 13.5% of a photo-initiator, benzoin isobutyl ether, based on the weight of the liquid after solvent stripping, was added.

EXAMPLE 2

In this example, the procedure and materials of Example 1 were employed, with the exception that the radiation-curable overcoating liquid applied had the following composition.

| | % By Weight |
|---|---|
| Voracryl AR-700 | 31.32 |
| Pentaaerythritol Tetra-acrylate | 18.81 |
| 1,6-Hexanediol diacrylate | 15.67 |
| Actomer X-70 | 15.67 |
| Acrylic Acid | 16.04 |
| Stearyl acrylate | 1.89 |
| Halocarbon Oil 437 | 0.48 |
| Zonyl FSN | 0.11 |

Voracryl AR-700 is an acrylated polyether triol-polyisocyanate prepolymer prepared according to Example 3 of co-pending application Ser. No. 400,364. Prior to application, 9.82% of a photo-initiator, benzoin isobutyl ether, based on the weight of the above liquid mixture, was added.

EXAMPLE 3

The following composition was substituted for the composition in Example 2.

| | % By Weight |
|---|---|
| Epocryl 25 A 60 | 29.85 |
| 1,6-Hexanediol diacrylate | 29.85 |
| Trimethylalpropane triacrylate | 24.87 |
| Voracryl AR-700 | 12.45 |
| Silane A-174 | 2.34 |
| p. methoxy phenol | 0.023 |
| Halocarbon 437 | 0.53 |

-continued

| | % By Weight |
|---|---|
| Zonyl FSN | 0.079 |

Again, the first two ingredients were mixed, the volatile solvent in the Epocryl 25 A 60 removed, the remaining ingredients added, and 13.53% photo-initiator added prior to application.

In Examples 4–9 in TABLE I below, the label base materials stated and the tie coats therefor were substituted for the KIMDURA of Example 1.

TABLE I

| Example | Label Base Material | Tie Coat |
|---|---|---|
| 4 | Paper | none |
| 5 | Kromekote | none |
| 6 | Vinyl film | Vinyl lacquer |
| 7 | Paper backed foil | Vinyl lacquer |
| 8 | Aluminum foil | Vinyl lacquer |
| 9 | Metallized Mylar | Polyester lacquer |
| 10 | Mylar film | Polyester lacquer |

The Zahn cup viscosity measure is widely used in industry and is described in "A New Method For Viscosity Determination", the General Electric Review, GEREA, June, 1937, p. 285 and in the PAINT TESTING MANUAL, 13th Edition, 1972, ASTM Special Technical Publication No. 500 of the American Society for Testing Materials, 1916 Race Street, Philadelphia, PA 19103.

The liquid radiation curable overcoating compositions herein disclosed should be applied in a thickness sufficient to provide the required appearance and protective properties but should not be excessive to avoid decreasing the curing rate and unnecessary cost. Thicknesses of between 0.2 and 0.4 mils and preferably about 0.3 mil have been found suitable. They can be formulated for high gloss or modified by known techniques for matte finishes as desired. Other suitable coating techniques such as letter-press, rotogravure or reverse roll coating can be employed. The overcoating compositions can be cured at any convenient temperature including room temperature or moderately elevated temperatures. Temperatures injurious to the underlying materials should be avoided and curing below about 200° F. is preferred.

What is claimed is:

1. A method of making a series of laid-on labels each of which has a solvent and abrasion resistant overcoating, the labels being spaced apart on a temporary carrier web from which each label is individually removable, said method comprising as steps, a. providing a series of laid-on labels spaced apart and removably adhered to a temporary carrier comprising a carrier web having a release surface in contact with the underside of the labels and exposed in the spaces between labels, said labels comprising an adhesive, a base layer, and indicia over the base layer, b. forming a continuous film over the surface of said labels and a discontinuous film over the exposed release surface of the carrier web between labels by applying to the surface of both the labels and exposed release surfaces a thin layer of radiation-curable liquid, said liquid wetting the surface of the labels but not the exposed release surfaces, the liquid forming over said exposed release surfaces by surface tension beads of liquid substantially unconnected to the continuous film over the surfaces of the labels, and thereafter, c. exposing said films to a source of radiation sufficient to cure the liquid overcoating on the labels to a solvent and abrasion resistant layer.

2. The method of claim 1 wherein said radiation curable liquid is substantially free of non-reactive solvent and has a viscosity at room temperature of less than about 200 seconds as measured with a No. 2 Zahn cup.

3. The method of claim 2 wherein said liquid has a viscosity less than about 100 seconds.

4. The method of claim 1 wherein said web is moved along a path at a speed of at least about 75 feet per minute and said liquid films are cured in air at a temperature below about 200° F.

5. The method according to claim 3 wherein said liquid comprises a solution of an acrylated epoxy prepolymer in acrylate monomers.

6. The method according to claim 3 wherein said liquid comprises a solution of a prepolymer which is the condensation product of an acrylated polyisocyanate polyether dissolved in acrylate monomers.

7. The method of claim 6 wherein said prepolymer is the stepwise reaction product of (a) substantially three mols of a polyisocyanate with (b) substantially one mol of a polyether triol and (c) an alcohol having unsaturated terminal carbon groups, and wherein said monomers include at least one monomer having three or more unsaturated acrylate or methacrylate groups.

8. The method of claim 1 wherein said radiation is ultra-violet light and wherein said liquid contains a photoinitiator sensitive to ultra-violet light.

9. The method of claim 1 wherein said continuous film is between about 0.2 and 0.4 mil in thickness.

10. The method of claim 4 wherein said liquid is applied in at least two applications each of which applies a part of the total film, the later application smoothing the film applied in the first application.

11. The method of claim 1 wherein said initial series of laid-on labels, prior to overcoating with radiation-curable liquid, is provided by printing indicia on the surface of a laminate comprising a carrier web having a release surface, an adhesive over the release surface, and a base layer over said adhesive, die-cutting a series of labels from the printed laminate by cutting through all of said layers except said carrier web to form a skeleton of laminate between labels, and stripping said skeleton from the carrier web.

12. The method of claim 11 wherein adhesion-promoting tie coat means is applied to said base layer prior to printing, said tie coat improving the adhesion of the cured liquid film to the base layer.

13. The method of claim 1 wherein said liquid contains wetting agent means for improving the wetting of the surface of said labels by said liquid.

14. A method of making a series of laid-on labels each of which has a solvent and abrasion resistant overcoating, the labels being spaced apart on a temporary carrier web from which each label is individually removable, said method comprising as steps a. applying adhesion-promoting tie coat means to the surface of a laminate comprising a carrier web having a release surface, an adhesive in contact with said release surface, and a label base layer, said tie coat being applied to said base layer and being adapted to improve the adhesion to said base layer of inks and coatings subsequently applied thereto, b. printing indicia over said tie coat to form a plurality of printed labels, c. die-cutting through all of said layers except said carrier web in the peripheral outline of said labels, thereby forming a skeleton of surplus material between labels, d. stripping away said skeleton, e. moving said carrier web and plurality of labels along a path at a linear speed of at least about 75 feet per minute, f. forming a continuous film over the surface of said labels and a discontinuous film over the carrier web release surface exposed between labels by applying, in at least two applications, to the carrier web and labels moving along said path a thin layer of liquid curable by exposure to ultra-violet radiation, said liquid containing a photo-initiator sensitive to ultra-violet radiation and wetting agent means for improving the wetting of the surface of said labels by said liquid, said liquid having a viscosity less than about 100 seconds as measured by a No. 2 Zahn cup, said liquid wetting the surface of said labels but not wetting the exposed release surface of said carrier web, the liquid forming over said exposed release surfaces by surface tension beads of liquid substantially unconnected to the continuous films over said labels, and thereafter g. passing said labels and carrier web in air under a source of ultra-violet radiation sufficient to cure said liquid films over the labels to a solvent and abrasion resistant overcoating layer.

15. The method of claim 14 wherein said liquid comprises a solution of acrylated epoxy prepolymer in acrylate monomers.

16. The method of claim 14 wherein said liquid comprises a solution of prepolymer in liquid acrylate monomers at least one of which has three or more unsaturated acrylate or methacrylate groups, said prepolymer being the stepwise reaction product of (a) substantially three mols of a polyisocyanate with (b) substantially one mol of a polyether triol, and (c) an alcohol having unsaturated terminal carbon groups.

* * * * *